A. J. NELLIS.
POTATO DIGGER.

No. 181,467. Patented Aug. 22, 1876.

Witnesses:

Inventor:
Aaron J. Nellis
by Bakewell & Kerr
Attys

UNITED STATES PATENT OFFICE.

AARON J. NELLIS, OF PITTSBURG, PENNSYLVANIA.

IMPROVEMENT IN POTATO-DIGGERS.

Specification forming part of Letters Patent No. 181,467, dated August 22, 1876; application filed July 3, 1876.

*To all whom it may concern:*

Be it known that I, AARON J. NELLIS, of Pittsburg, in the county of Allegheny and State of Pennsylvania, have invented a new and useful Improvement in Potato-Diggers; and I do hereby declare the following to be a full, clear, and exact description thereof, reference being had to the accompanying drawing, forming part of this specification, in which—

Figure 1:
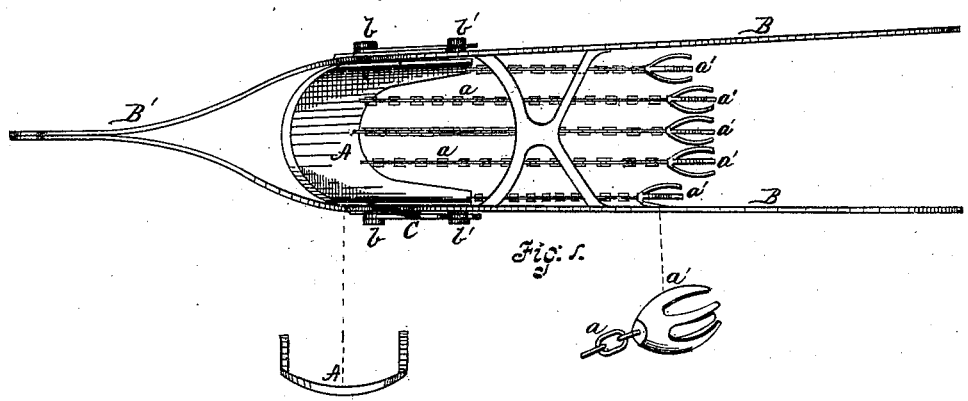
Figure 2:
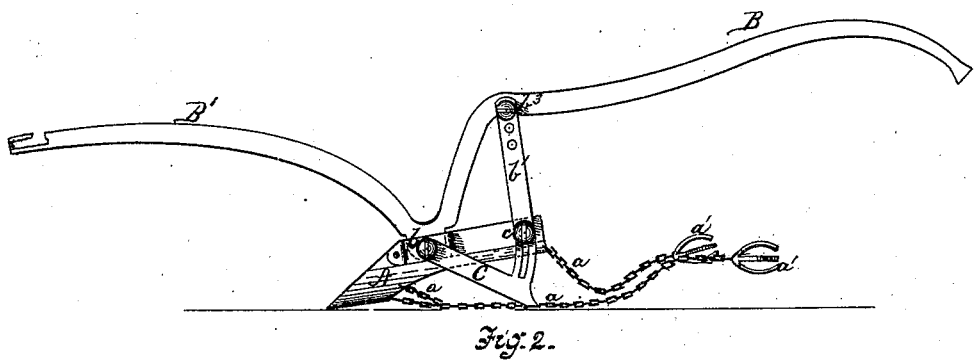

Figure 1 is a plan view of a potato-digger embodying my invention, and Fig. 2 is a side elevation of the same.

Like letters refer to like parts wherever they occur.

My invention relates to the construction of that class of potato-diggers wherein a digging blade or scoop is combined, with a series of agitating and separating chains; and consists in giving the scoop a single curve and crescentic form, so as to turn the earth and its contents to the center; in arming the free ends of the agitating chains with floats or bobs, which prevent the burrowing of the free ends of the chain, causing the same to be alternately tightened and slackened, and in other details of construction hereinafter specified.

I will now proceed to describe my invention, so that others skilled in the art to which it appertains may apply the same.

In the drawing, A indicates a crescent-shaped concave blade or scoop for unearthing the potatoes, or like tuber. B B' are the handles and beam, preferably formed in one, as shown, and pivoted to the forward part of blade A, as at $b$. From the rear of the blade or heel of the scoop rise standards $b^1$ $b^1$, slotted above and adjustably connected to the handles B by set-screws $b^3$, so that by raising or lowering the handles and beam B' the draft may be altered at will. C are adjustable guides or heel-pieces, pivoted to the forward part of the scoop, preferably at the same point as the beam, and connected to the heel of the scoop by set-screws $c$, so that the downward projection of the heel-pieces may be varied. These pieces serve to guide the scoop and keep it at a uniform depth in the soil, while at the same time they may be used as fulcra for lifting and controlling the toe of the scoop by depressing the handles B. $a$ $a$ are a series of chains connected to the rear of the crescent-shaped blade or scoop A, and are provided at their free ends with floats $a'$ of any shape which will drag freely and not burrow under ground. These floats cause a continuous irregular vibration of the chains, which facilitates the separation of the earth from the tuber, and delivers the tuber on the surface.

The operation of these devices is as follows: The draft having been regulated by adjusting the connection of the handles and standards $b^1$ $b^1$ and the heel-pieces C, the scoop or crescent will throw the earth and its contents to the center; from thence it falls back upon chains $a$, which are kept in constant irregular vibration by the surface drags or floats. The vibration of the chains lifts, loosens, and agitates the mass so as to free the potato from the adhering earth and leave the potato exposed, and this without bruising or injuring the tuber.

Having thus described my invention, what I claim, and desire to secure by Letters Patent, is—

1. In combination with the drag-chains of a potato-digger, the pronged floats $a'$ of general rounded form, substantially as and for the purpose specified.

2. The combination of the crescent-shaped scoop A with the agitating-chains $a$ $a$, provided with floats $a'$, substantially as and for the purpose set forth.

3. The combination of the crescent-shaped scoop A, having the agitating-chains $a$, with the pivoted handles and beam B B', and the standards $b^1$, substantially as specified.

4. The combination of the crescent-shaped scoop A, having the agitating-chains $a$, with the handles and beam B B', and the adjustable heel and guide pieces C, substantially as and for the purpose specified.

In witness whereof I, the said AARON J. NELLIS, have hereunto set my hand.

AARON J. NELLIS.

Witnesses:
F. W. RITTER, Jr.,
JAMES I. KAY.